United States Patent
Bowler et al.

(10) Patent No.: US 8,024,541 B2
(45) Date of Patent: Sep. 20, 2011

(54) PACKET MEMORY PROCESSING SYSTEM HAVING MEMORY BUFFERS WITH DIFFERENT ARCHITECTURES AND METHOD THEREFOR

(75) Inventors: Michael Bowler, Ottawa (CA); Neil Hamilton, Ottawa (CA); Michael Borza, Ottawa (CA)

(73) Assignee: Elliptic Technologies Inc., Kanata, Ontario (CA)

( * ) Notice: Subject to any disclaimer, the term of this patent is extended or adjusted under 35 U.S.C. 154(b) by 525 days.

(21) Appl. No.: 11/088,948

(22) Filed: Mar. 25, 2005

(65) Prior Publication Data
US 2006/0215675 A1    Sep. 28, 2006

(51) Int. Cl.
*G06F 12/00* (2006.01)
*G06F 12/08* (2006.01)

(52) U.S. Cl. ........ 711/170; 709/203; 707/609; 707/696; 707/701; 707/703; 707/705; 707/790; 707/793; 707/795; 707/800; 707/802

(58) Field of Classification Search .................. 711/170; 709/203; 707/609, 696, 701, 703, 705, 790, 707/793, 795, 800, 802
See application file for complete search history.

(56) References Cited

U.S. PATENT DOCUMENTS

| | | | |
|---|---|---|---|
| 5,913,024 A | 6/1999 | Green et al. | |
| 5,963,499 A * | 10/1999 | Leong et al. | 365/230.03 |
| 6,247,060 B1 | 6/2001 | Boucher et al. | |
| 6,332,195 B1 | 12/2001 | Green et al. | |
| 6,412,045 B1 | 6/2002 | BeKoning et al. | |
| 6,430,666 B1 * | 8/2002 | Roth | 711/202 |
| 6,434,620 B1 | 8/2002 | Boucher et al. | |
| 6,823,409 B2 * | 11/2004 | Jones et al. | 710/107 |
| 2003/0108045 A1 | 6/2003 | Jayam et al. | |

OTHER PUBLICATIONS

Leffler et al., Networking Implementation Notes 4.4BSD Edition, Computer Systems Research Group, Jun. 10, 1993, University of California, Berkeley.

\* cited by examiner

*Primary Examiner* — Midys Rojas
(74) *Attorney, Agent, or Firm* — Freedman & Associates

(57) ABSTRACT

An architecture for use in packet processing and supporting compatibility with current BSD implementations for packet processing is proposed wherein two MBUF formats are supported. A first format includes a header portion and a data portion for storing data therein. A second format includes a header portion but is absent a data portion and is for addressing data stored within a cluster and external to the MBUF itself.

11 Claims, 4 Drawing Sheets

PACKET MEMORY PROCESSING SYSTEM HAVING MEMORY BUFFERS WITH DIFFERENT ARCHITECTURES AND METHOD THEREFOR

FIELD OF THE INVENTION

The invention relates to the field of data networking protocol stack processors and more specifically to the field of managing of data packets in an efficient manner.

BACKGROUND OF THE INVENTION

Memory buffers (MBUFs) are well known in the software and hardware design of protocol stack processors. MBUFs according to the Berkeley Software Distribution (BSD) implementation include a control portion and a data portion. The MBUF allocated memory is of a fixed size relating to the memory available and communication data being processed. A typical choice for MBUF size is between 128 and 512 bytes.

BSD was designed with systems having significant power and memory resources in mind. In today's technology markets, wireless battery operated circuits are becoming ever more popular. With their popularity, increased resource efficiency becomes a critical limitation on performance.

It would be advantageous to provide an architecture for more efficient resource utilization that is backward compatible with current protocol implementations.

SUMMARY OF THE INVENTION

In accordance with the invention there is provided a memory buffer architecture for use with a BSD implementation comprising: a first MBUF format including a control portion and a data portion, the first MBUF format for use where data is to be stored within the MBUF; and, a second MBUF format including a control portion and absent a substantial data portion, the second MBUF format for use in indexing data within a cluster.

In accordance with another aspect of the invention there is provided a storage device comprising data stored therein, the data for resulting in implementation of an integrated circuit design including circuitry for allocating a first MBUF format including a control portion and a data portion, the first MBUF format for use where data is to be stored within the MBUF; and, a second MBUF format including a control portion and absent a data portion, the second MBUF format for use in indexing data within a cluster, the MBUFs including pointer data memory locations within a control portion thereof for being arranged in a linked list.

In accordance with another aspect of the invention there is provided a method of packet processing comprising: storing packet data within a linked list, the linked list including MBUFs linked together at least one of the linked MBUFs addressing data within a cluster external to said MBUF, wherein at least one of the at least one of the linked MBUFs comprises a control portion absent a data portion thereof, and wherein at least one of the other than the at least one of the linked MBUFs comprises a control portion and a data portion.

BRIEF DESCRIPTION OF THE DRAWINGS

Exemplary embodiments of the invention will now be described in conjunction with the following drawings, in which.

DETAILED DESCRIPTION THE INVENTION

Figure 1:
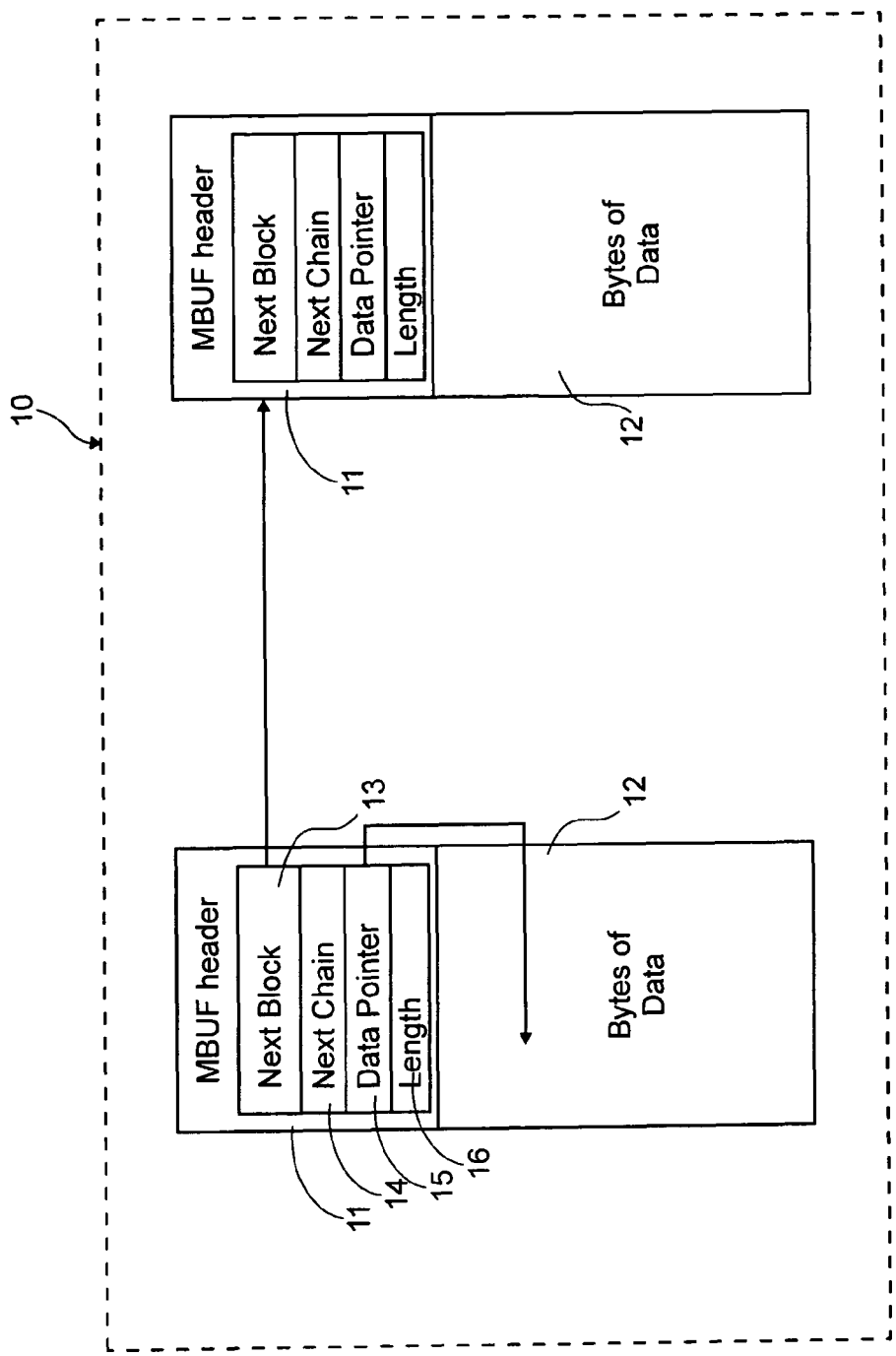
FIG. 1 illustrates a plurality of prior art memory buffers (MBUFs)

FIG. 1 illustrates a chain consisting of two MBUFs 10 according to the prior art. Each MBUF comprises control data 11 in the form of an MBUF header comprising a link address for a next block 13, a link address for a next chain 14, a data address 15, and a data length 16. Typically, the MBUF header occupies 32 bytes. Each MBUF further comprises a data portion 12 for storing of data therein. Typically, MBUFs are between 128 and 512 bytes with an MBUF of 256 bytes being most typical. As such, the use of MBUFs is relatively memory efficient for small packets.

Figure 2:
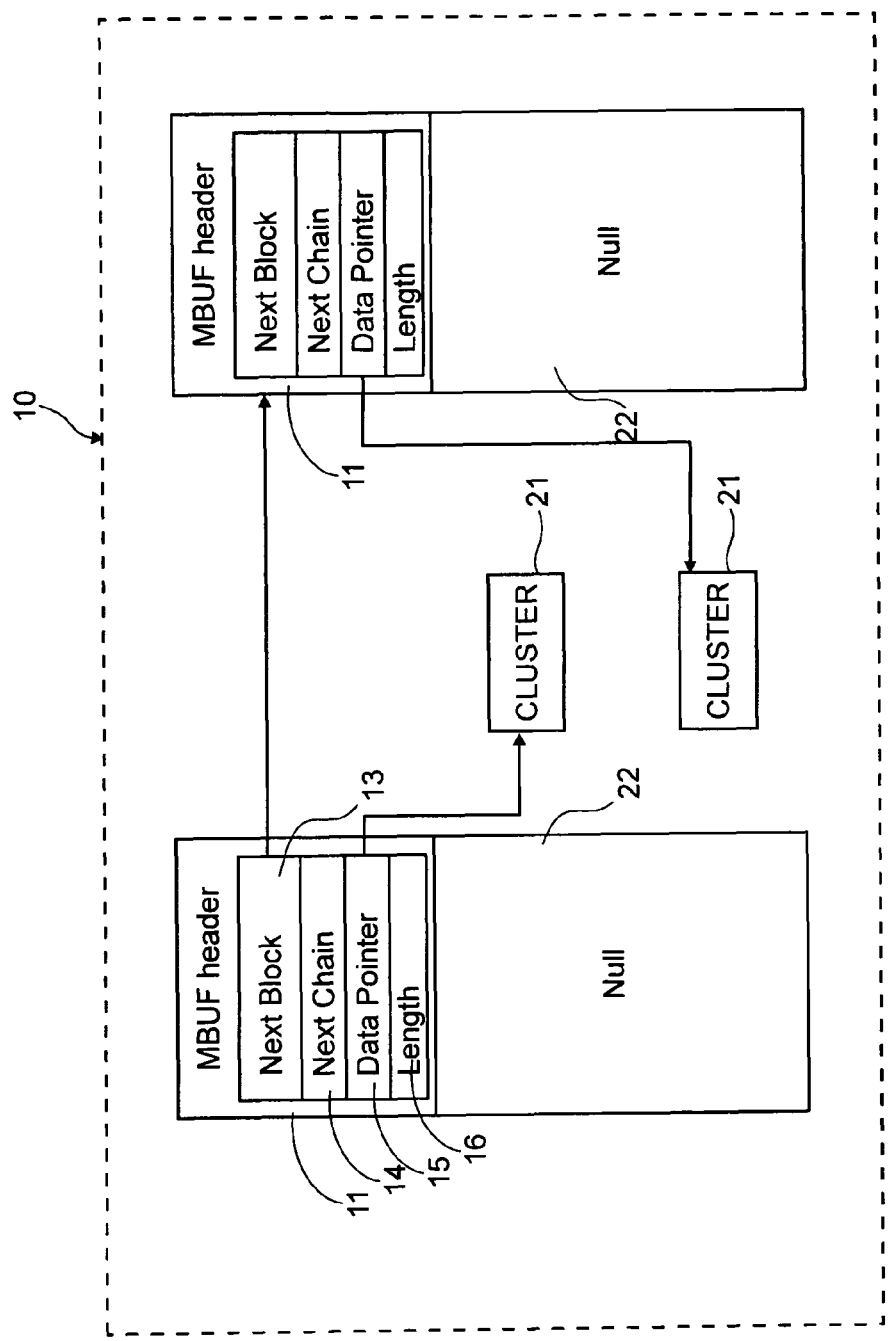
FIG. 2 illustrates a plurality of prior art MBUFs in a chain and addressing data within a cluster.

Referring to FIG. 2, for larger data packets, a cluster 21 is often used wherein the data portion 22 of the MBUF 10 is unused and the cluster 21—a separate data location within memory—is used for storing of the data. The control portion 11 of the MBUF 10 remains similarly utilized though the data pointer 15 points to an address within the cluster. In this fashion, the memory usage is not overly represented by the control data portion 11 of the MBUF 10 and the null MBUF data portion 22 is small compared to the amount of data stored within the cluster 21. Thus, memory usage efficiency remains regardless of packet data size.

The prior art MBUF structure suffers from considerable drawbacks for very high efficiency operation. Firstly, the memory storage wasted by unused data memory both in MBUFs relying on data within clusters and within MBUFs whose data portions are other than completely utilized is of concern. Also, allocating more memory than necessary can be problematic in integrated devices where available memory is highly constrained. Thirdly, in cases where MBUF reorganization is necessary, efficiency is further reduced.

Figure 3:
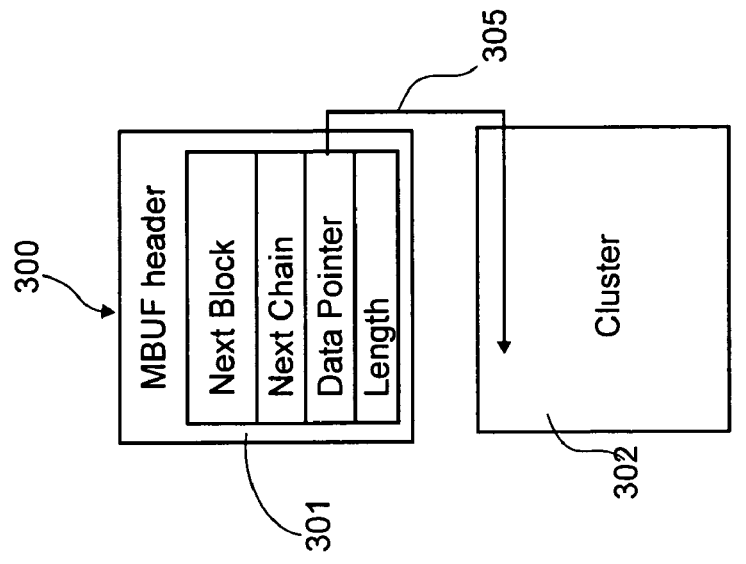
FIG. 3 illustrates two MBUFs having different formats in accordance with the present invention; and, FIG. 4 illustrates a chain of MBUFs addressing data within a cluster, some of the MBUFs having a first form and some of the MBUFs having a second other form.
Figure 3:
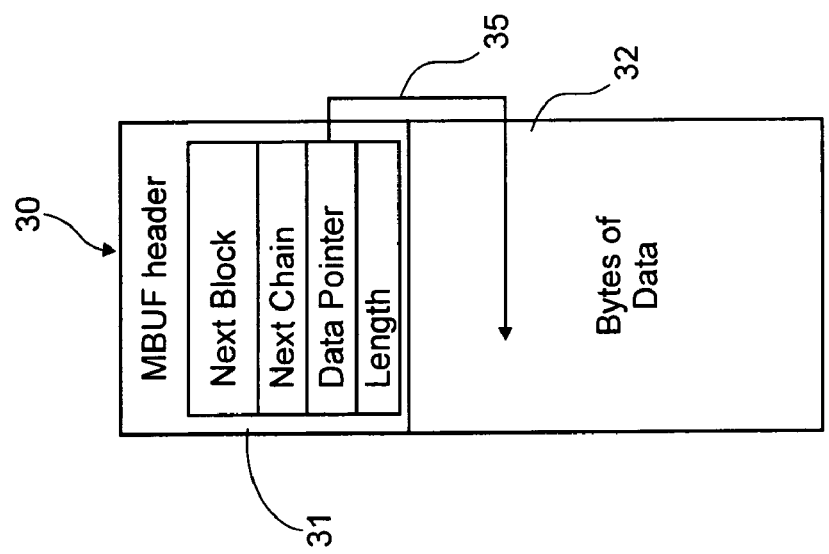

Referring to FIG. 3, an MBUF architecture is shown including two distinct MBUF formats 30 and 300. The first MBUF format 30 is a typical MBUF format with a control portion 31 and a data portion 32 having a memory size selected for memory utilization efficiency. A pointer 35 from the control portion 31 addresses the data within the data portion 32. The second MBUF format 300 includes only the control portion 301 for use in addressing data stored within a cluster 302 and typically occupies only 32 bytes.

The enhanced memory efficiency of the two formats of MBUFs 30 and 300 is highly advantageous. For example, the format is compatible with existing protocols and BSD software since it does not allocate an unused resource. Modifying existing implementations in a fashion that is backwards compatible is often desirable.

Figure 4:
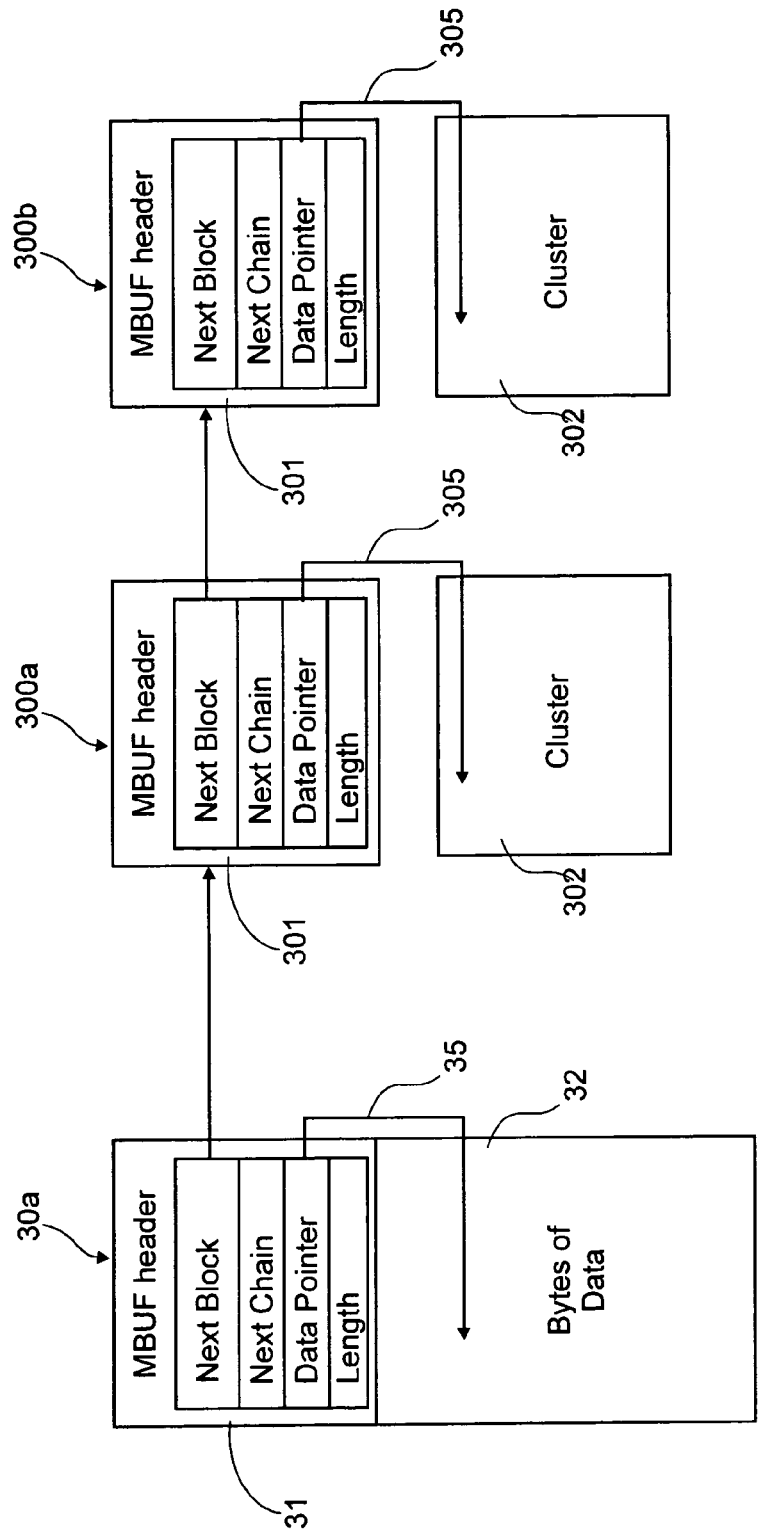

Referring to FIG. 4, a chain of MBUFs is shown comprising both types of MBUFs in accordance with the invention. A first MBUF in the chain 30a, is an MBUF of the first type including both an MBUF control portion 31 and a data portion 32. Pointer 35 within the MBUF 30a addresses data within the data portion 32 of the MBUF 30a. A next MBUF pointer within the MBUF control portion 31 addresses a subsequent MBUF 300a. The subsequent MBUF 300a consists of an MBUF control portion 301. Alternatively, the MBUF 300a comprises an MBUF control portion and is absent a data portion for storing of data therein. The data pointer 305 within the MBUF 300a addresses data within cluster 302. A next MBUF pointer within the MBUF control portion 301 addresses a subsequent MBUF 300b within the chain of MBUFs. The subsequent MBUF 300b consists of an MBUF control portion 301. Alternatively, the MBUF 300b comprises an MBUF control portion and is absent a data portion for storing of data therein. The data pointer within the MBUF 300b addresses data within a cluster 302. The next block pointer and the next chain pointer within MBUF 300b are each indicative of a lack of further MBUFs within the chain and of a lack of further chains linked to the MBUF chain, respectively.

Numerous other embodiments may be envisaged without departing from the spirit or scope of the invention.

What is claimed is:

1. A memory buffer (MBUF) architecture for use in accordance with a Berkeley Software Distribution (BSD) networking implementation comprising:
    a first MBUF format including a control portion and a data portion, the control portion of the first MBUF format including a next MBUF pointer and a data pointer other than the next MBUF pointer, the first MBUF format for use where data is to be stored within the MBUF, the first MBUF format according to a BSD network implementation; and,
    a second MBUF format including a control portion and absent a data portion, the control portion according to a control portion of an MBUF according to a BSD networking implementation, the control portion of the second MBUF format including a next MBUF pointer and a data pointer other than the next MBUF pointer, the second MBUF format for use in indexing with use of the data pointer of the control portion of the second MBUF format, data within a cluster that is stored outside of the MBUF architecture,
    wherein the MBUF architecture comprises a linked list of the first and second MBUFs, linked with use of the next MBUF pointer of the control portion of the first MBUF format and with use of the next MBUF pointer of the control portion of the second MBUF format, and wherein the linked list comprises at least one MBUF of the second MBUF format, the at least one MBUF comprising a next MBUF pointer pointing to a second MBUF of the second format within the linked list.

2. A memory buffer architecture according to claim 1, wherein the linked list is a two dimensional linked list.

3. A memory buffer architecture according to claim 1, wherein the linked list of MBUFs is representative of a single communication packet.

4. A memory buffer architecture according to claim 1, wherein the linked list of MBUFs is representative of a single communication stream.

5. A storage device comprising data stored therein, the data for resulting in implementation of an integrated circuit design including circuitry for allocating
    a first memory buffer (MBUF) format including a control portion and a data portion, the first MBUF format for use where data is to be stored within the MBUF, the first MBUF format according to a BSD network implementation; and,
    a second MBUF format including a control portion and absent a data portion for storing of buffered data therein, the control portion according to a control portion of an MBUF according to a BSD networking implementation, the control portion of the second MBUF format including a data pointer, the second MBUF format for use in indexing with use of the data pointer of the control portion of the second MBUF format, data within a cluster that is stored outside of an MBUF structure, the MBUF structure comprising a linked list of first and second MBUFs,
    wherein the first MBUF format and the second MBUF format each include a next MBUF pointer other than the data pointer, within a respective control portion thereof for being arranged in the linked list, and wherein the linked list comprises at least one MBUF of the second MBUF format, the at least one MBUF comprising a next MBUF pointer pointing to a second MBUF of the second format within the linked list.

6. A storage device according to claim 5, wherein the integrated circuit is for use in packet processing in accordance with a Berkeley Software Distribution (BSD) implementation, the MBUF formats forming MBUFs operational in accordance with said BSD implementation.

7. A storage device according to claim 5, having further data stored therein, the further data for resulting in implementation of an integrated circuit design including circuitry for allocating one of the first and second MBUF formats in dependence upon received data wherein one of the first and second MBUF formats is selected for being associated with data within the received data, said one being determined upon receipt of the data.

8. A storage device according to claim 5, having further data stored therein, the further data for resulting in implementation of an integrated circuit design including circuitry for allocating one of the first and second MBUF formats in dependence upon received data wherein one of the first and second MBUF formats is selected for being associated with data within the received data, said one being determined upon receipt of the data, the second MBUF format selected for indexing data within at least a cluster.

9. A storage device according to claim 5, having further data stored therein, the further data for resulting in implementation of an integrated circuit design including circuitry for allocating one of the first and second MBUF formats in dependence upon received data wherein one of the first and second MBUF formats is selected for being associated with data within the received data, said one being determined upon receipt of the data, the second MBUF format selected for indexing data within at least a cluster and the first MBUF format selected for at least one of pre-allocating memory data storage for later use and for storing of data within a data portion thereof.

10. A method of packet processing comprising:
    storing packet data within a linked list, the linked list including MBUFs each comprising a control portion including a pointer to a next MBUF within a chain of MBUFs, a pointer to a next MBUF in a queue of packets, and a storage location for a length of data in the MBUF linked together, an MBUF of the linked MBUFs addressing data within a cluster external to said linked list with use of a data pointer other than pointing to a next MBUF, wherein said MBUF comprises a control portion and absent a data portion thereof and wherein said MBUF comprises a pointer to a next MBUF which points to a further MBUF, the further MBUF comprising a control portion and absent a data portion, and at least another MBUF of the linked MBUFs comprises a control portion and a data portion, and wherein the method is for use in packet processing compatible with the Berkeley Software Distribution (BSD) implementation, each MBUF within the linked MBUFs forming MBUFs operational in accordance with said implementation.

11. A method according to claim 10, comprising:
    receiving data; and, in dependence upon the received data, allocating an MBUF format selected from a first MBUF format for an MBUF having a control portion and data portion and a second MBUF format for an MBUF having a control portion and absent a data portion in dependence upon the received data wherein the second MBUF is selected for indexing data within clusters.

* * * * *